United States Patent [19]

Ushijima et al.

[11] Patent Number: 5,012,166
[45] Date of Patent: Apr. 30, 1991

[54] CONTROL SYSTEM FOR BRUSHLESS DC MOTOR

[75] Inventors: Nobuyoshi Ushijima, Odawara; Hiroshi Masuda, Hiratsuka; Akira Ishibashi, Tokyo; Masahiko Satou, Odawara; Toshiyuki Haruna, Odawara; Norikazu Takayama, Odawara; Yoshinobu Kudou, Minamiashigara, all of Japan

[73] Assignee: Hitachi, Ltd., Tokyo, Japan

[21] Appl. No.: 460,990

[22] Filed: Jan. 4, 1990

[30] Foreign Application Priority Data

Jan. 18, 1989 [JP] Japan .................................. 1-7822

[51] Int. Cl.$^5$ .............................................. H02P 7/00
[52] U.S. Cl. ........................................ 318/254; 318/439
[58] Field of Search ............... 318/254, 254 A, 255, 318/138, 139, 439, 718–723, 696, 700, 705, 704, 711, 712, 716, 717; 388/803, 805, 813

[56] References Cited

U.S. PATENT DOCUMENTS

| | | | |
|---|---|---|---|
| 4,250,435 | 2/1981 | Alley et al. | 318/439 X |
| 4,310,787 | 1/1982 | Seeger et al. | 318/721 X |
| 4,455,513 | 6/1984 | Fulton et al. | 318/439 X |
| 4,684,858 | 8/1987 | Ma et al. | 318/439 X |
| 4,694,210 | 9/1987 | Elliott et al. | 318/439 X |
| 4,743,815 | 5/1988 | Gee et al. | 318/254 |
| 4,814,677 | 3/1989 | Plunkett | 318/254 |
| 4,922,169 | 5/1990 | Freeman | 318/254 |

FOREIGN PATENT DOCUMENTS

251785  7/1988  European Pat. Off. .

*Primary Examiner*—William M. Shoop, Jr.
*Assistant Examiner*—A. Jonathan Wysocki
*Attorney, Agent, or Firm*—Fay, Sharpe, Beall, Fagan, Minnich & McKee

[57] ABSTRACT

A control method for brushless DC motor having a rotor, a plurality of magnetic poles and coils of a plurality of phases involves sequentially applying a current to one phase for a prescribed time, stopping the current temporarily and then reapplying the current to the same phase. The state of the rise of the current when it begins to flow to the phase, is measured. The position of one of the magnetic poles located at a position opposite to the particular phase is detected based on the measured state of the rise of the current. In response to the position of the magnetic pole, it is determined whether the flow of the current is to be switched over to the following phase or not. If so, the current is switched over the following phase and the process is repeated. Constant speed control may be accomplished by reading information from a driven disk to determine speed, comparing the speed to a fixed speed, and selectively applying by time sharing a normal current, a brake current and an acceleration current.

34 Claims, 11 Drawing Sheets

FIG. 8A
COIL TERMINAL VOLTAGE OF PHASE U

FIG. 8B
CURRENT LIMIT SIGNAL

FIG. 8C
CURRENT DETECTION

FIG. 8D
COMMUTATION SIGNAL

FIG. 8E
MEASURING INSTRUCTION

CONTROL SYSTEM FOR BRUSHLESS DC MOTOR

BACKGROUND OF THE INVENTION

The present invention relates to a brushless DC motor and, more particularly, relates to a control system of the brushless DC motor which is suitable for rotating precision apparatus, for example, a magnetic disk in a magnetic disk apparatus, without a magnetic sensor.

In conventional brushless DC motors, a magnetic sensor such as a Hall element is employed, instead of a brush, to detect a rotor position relative to a stator. A coil or phase to which a current is made to flow is switched over in accordance with the detected rotor position.

However, control methods of the brushless DC motor wherein the rotor position is detected without using the magnetic sensor have been proposed.

As is described in the Japanese Patent Laid-Open No. 59-162793, for instance, a method has been proposed wherein a counterelectromotive voltage signal generated in a coil with the rotation of a field rotor of the brushless DC motor is used to detect the rotor position so as to determine the timing of making a driving current flow to each coil.

Moreover, as is described in the EPC Application Laid-Open No. 251785, a starting method has been proposed wherein a high-frequency current forming a short current pulse is made to flow through each coil while the motor is rotated. A peak amplitude value of this current is measured to detect the rotor position so as to determine the timing of making the driving current flow to each coil. Also a second method is proposed for switching when the current rises above a value that changes with speed. For constant speed rotation, current is varied by detecting speed according to timing marks on a rotated disk.

SUMMARY

In the above method of detecting the counterelectromotive voltage, when a counterelectromotive voltage signal is detected, a coil to which a current is made to flow is changed to the next coil. However an occurrence of the counterelectromotive voltage means a passing of proper position for a commutation, and brake torque generated by the counterelectromotive voltage makes efficiency of the rotation worse.

The method wherein the current pulse is made to flow through each coil also has a problem that the current is let to flow also to a phase inducing a force of rotation in the reverse direction, consequently, and thus a fluctuation of a driving torque increases, since feeding is stopped in the course of electrification of the coil and the current pulse flows to all of the other coils.

There is a problem that a detection time is required to make the current rise from zero to a necessary current value. It is necessary to stop supplying a driving current of the coil, and efficiency of the motor rotation gets worse. Further the method can not be used in an area of high-speed rotation because it takes a relatively long time to detect rotor position, and the time supplying a driving current to the driving coil becomes short as speed increases. This reduces driving torque. According to a calculation for the inventors, for example, when running a 6-phase brushless DC motor at 3600 rpm, a time during which a current is made to flow in the coil is 1.39 mS. If a high frequency pulse, for example 0.2 mS, is flowed to each coil sequentially, the real time of driving current flow is 1.39 -(0.2×6)=0.19 mS. Therefore, the efficiency of motor rotation get worse and torque reduces because it takes more than half of the driving time for detecting rotor position.

A first object of the present invention is to provide a control method of the brushless DC motor without using a magnetic sensor.

A second object of the present invention is to provide a control method of the brushless DC motor which has high efficiency of rotation even in an area of high-speed rotation.

A third object of the present invention is to provide a control method of the brushless DC motor which has relatively simple circuit construction.

A fourth object of the present invention is to provide a control method of the brushless DC motor accompanied by little fluctuation of its driving torque.

A fifth object of the present invention is to provide a highly responsive speed control of the brushless DC motor wherein an acceleration current, a regular rotation current and a braking current are switched over on the basis of a servo signal controlling an operation of positioning a magnetic head.

A sixth object of the present invention is to provide a control method of the brushless DC motor by using a sector servo signal recorded on a magnetic disk.

A brushless DC motor which has a rotor provided with a magnet having a plurality of poles and has coils having a plurality of phases is used. A driving current for generating a magnetic flux is made to flow for every prescribed time through the coils. These coils are switched over sequentially, so as to rotate the field rotor synchronously.

The control system of a brushless DC motor provides control from a starting time to a time of steady-state rotation by three modes. Mode A controls from starting to slow rotation. Mode B controls from slow rotation to constant rotation. Mode C controls constant rotation, for example 3600 rpm.

In mode A, the driving current, a supply of a current to one phase, is stopped temporarily for a short period. After the period, the stopped driving current flows again to the same phase. A rise of the driving current is measured when it begins to flow. Some methods of measuring the rise are available. For example, the driving current is measured by a rise time from the driving current value 0 to a prescribed value. Or a clock signal is used, and the number of times of generation of said clock signal for the time required for the rise of the driving current from the current value 0 to the prescribed current value is measured.

Then the position of the magnet of the rotor which is located at a position opposite to the phase made to flow is detected by the rise of the driving current. The rise of the drive current in the phase is varied in accordance with the position of the magnet opposite thereto. When the driving current rises in the shortest time, a magnet generating a magnetic field opposite in direction to a magnetic field generated in the phase by the driving current flowing thereto is determined as positioned.

A judgment is made from said detected position of the magnet whether the flow of the driving current be switched over to the coil of a next phase or not. The phase to which the driving current is made to flow is determined to be switched over, when the rise time of the driving current is delayed from a fixed reference value.

When the driving current is judged to be switched over to the coil of the next phase, the driving current is switched over to the next coil. When the driving current is judged not to be switched over to the coil of the next phase, the detection of the rotor position is repeated after a prescribed interval.

In mode B, when the driving current flowing through the coil of each phase is switched over, a rise time of a driving current of a phase selected by switching is measured. Then a time for energization for making the driving current of the selected phase flow is determined, according to the time for the rise. After the time for energization passes, the driving current is switched to a next phase.

In mode C, a number of rotations of the brushless DC motor is measured. Some method of measuring the number of the rotation may be used. In a brushless DC motor for a magnetic disk apparatus, the servo information recorded on a magnetic disk is used for measuring the number of rotations.

When the number of rotations is larger, a current of the same amplitude substantially as a starting current flows for a certain short time to a phase through which the driving current is let to flow. When the number of rotations is smaller, a brake current flows for a certain short time to a phase through which the driving current is let to flow. In other work, a first current amount made to flow at the time of steady-state rotations, a second current amount made to flow when the speed of the motor is increased and a third current amount made to flow when the speed of the motor is reduced are set, and these three current amounts are switched over in a time-sharing manner to perform a constant speed control of the brushless DC motor.

The other objects will be more apparent from the following detailed description, when taken in conjunction with the accompanying drawings.

BRIEF DESCRIPTION OF DRAWINGS

FIGS. 7 (A) to (C) are illustrations for showing methods of measuring the rise of the driving current.

FIGS. 8 (A) to (F) are a diagrams for illustrating a timing of switching of the driving current of the motor at the time of acceleration.

FIG. 15 (a) represents the correlation of the rotor position with the amount of a driving current.

FIG. 15 (b) represents the correlation of the rotor position with torque of the brushless DC motor.

DESCRIPTION OF THE PREFERRED EMBODIMENTS

Embodiments of the present invention will be described with drawings.

Figure 2:
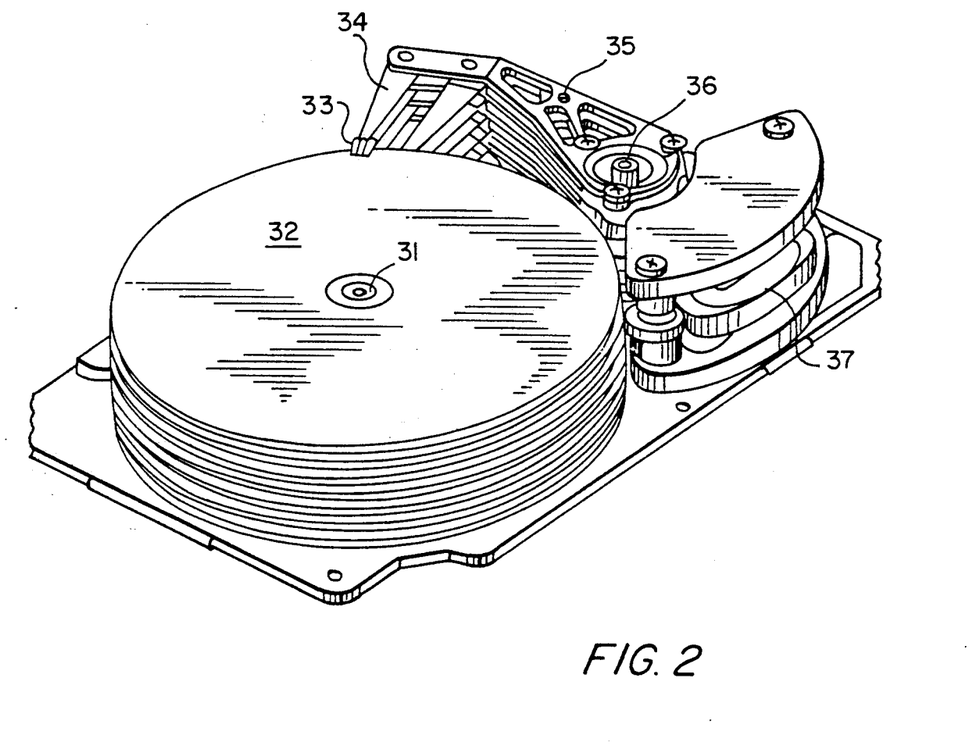
FIG. 2 is a perspective view of a magnetic disk apparatus using the brushless DC motor of the present embodiment.

FIG. 2 is a perspective view of a magnetic disk apparatus. A spindle motor 31 is a so-called in-hub type motor whose outer casing is integrated with a hub to be loaded with disks 32 and the brushless DC motor 31 of the present invention is applied thereto. A magnetic head 33 records/produces signals on and from the magnetic disk 32. A load spring 34 presses the magnetic head 33 on the disk 32 with a fixed force. A head arm 35 is so constructed as to swing around a shaft 36. A voice coil motor 37 drives the head arm 35.

Figure 3:
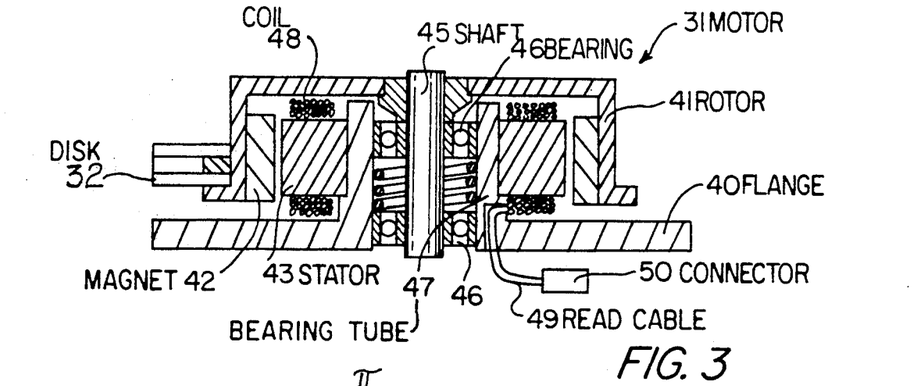
FIG. 3 is a sectional view of the brushless DC motor of the present embodiment.

FIG. 3 is a sectional view of the brushless DC motor 31 of the present embodiment.

A flange 40 is secured to a bearing tube 47, which supports a bearing 46. A rotor 41 is a rotatable portion of the motor 31, in this embodiment, the rotor 41 is also a hub for mounting disks 32. The rotor 41 is secured to a shaft 45. A magnet 42 is secured to the inner side of the rotor 41. A stator 43 generates a magnetic flux by supplying a drive current to a coil 48. The stator 43 is formed by winding a cable on laminated iron plates. The shaft 45 is supported rotatably by the bearing 46. A read cable 49 supplies a driving current to the coil 48, and connects to a motor control circuit (not shown in FIG. 3) by a connector 50.

Figure 4:
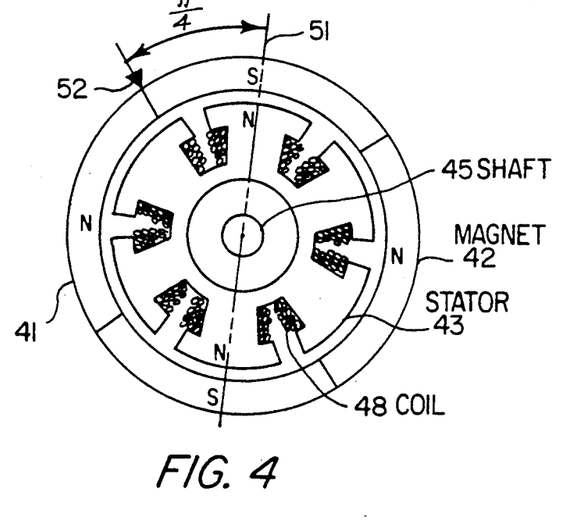
FIG. 4 is an illustration showing the disposition of a rotor and a stator of the brushless DC motor shown in FIG. 3.

FIG. 4 is an illustration of the rotor 41 and the stator 43 of the motor. The magnet 42 is a cylindrical magnet consisting of four poles, for example. The stator 43 has a structure having three phases, and it is of a so-called six-pole three-phase type wherein two N-poles are formed as shown in FIG. 4 when one phase is electrified.

Figure 5:
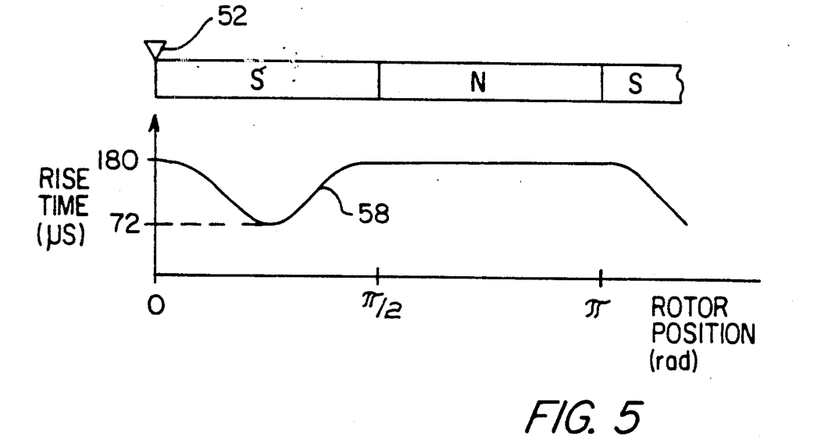
FIG. 5 is an illustration showing the correlation of a rotor position with the rise time of a driving current.

FIG. 5 is an illustration showing current flow to one phase of the stator 43, in the state of FIG. 4. A horizontal axis represents a rotational position of the rotor 41 relative to the stator 43. For example, a difference in degrees between a starting point 52 of a magnet pole transition (here S to N) of the rotor 41 and a center position 51 of a coil of the stator 43 to which is flowing a drive current 56. A vertical axis represents a rise time of drive current flowing to the coil 48 from 0 volts to a steady-state value, when a drive current is made to flow in the coil 48 having the center position 51. The rise time of the drive current in the coil 48 is varied in accordance with the position of the magnet 42 opposite thereto.

The inventors discovered that the rise time becomes minimum when the coil center position 51 is opposite to a magnet center point or position of different pole (such position is shown in FIG. 4), and it increases as the rotor separates from this position.

Figure 6:
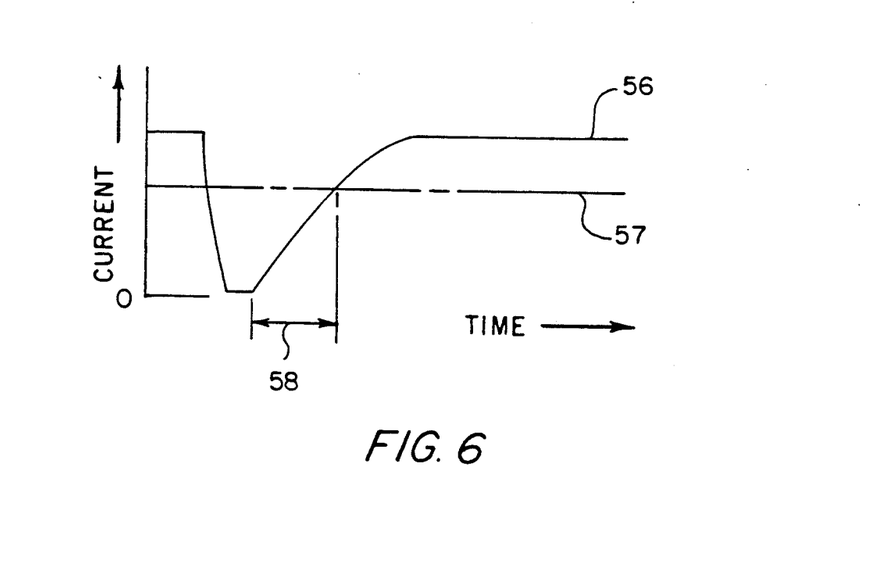
FIG. 6 is an illustration showing a rise state of the driving current at the time when the driving current is starts to flow.

FIG. 6 is an illustration showing a rise state of a driving current 56 from 0 to a steady-state value. In this case, a rise time 58 required for a current value to rise from 0 to a prescribed current value 57 becomes minimum when the center of the coil of the stator 43 that has such current is opposite to the center of a different pole of the magnet 42 as illustrated in FIG. 5. By measuring this rise time 58, accordingly, it can be determined whether the different pole of the magnet 42 is centered at a position opposite the stator 43 to which a current is made to flow or not. According to the invention, the rotor position is detected by measuring said rise time. When the rotor approaches a proper position for a commutation, a driving current 56 is changed to the next coil(phase).

Next, a block diagram of the embodiment of this invention will be explained by FIG. 1.

The motor 31 is a six-pole three-phase type, for example, and makes a magnetic disk 32 rotate. The motor 31 is controlled by using three modes, mode A controls from starting to slow rotation, mode B controls from slow rotation to constant rotation and mode C controls constant rotation (for example, 3600 rpm).

An oscillator circuit (OSC CKT) 1 generates a timing pulse for a control of motor rotation, and has an oscillator (OSC) 2 having a crystal oscillator and a frequency divider 3 which makes a desired frequency clock. A signal selection circuit 4 selects an input signal in accordance with the motor control mode described above. Information about the motor control mode is stored in a state control circuit 18 in controller 16.

A timing generator 5 selects an output of a feed switching circuit 6 in accordance with the output signal of the signal selector circuit 4. Namely, timing generator 5 determines a coil to which a driving current is made to flow. The feed switching circuit 6 supplies a driving current to the coil 48 selected by the timing generator 5. A current limiter circuit 21 limits to some fixed lower value greater than zero or cuts to zero the driving current for a short time, for example 10μs, to detect rotor position in mode A. A current detector circuit 22 detects a state of a rise of drive current 46 which is cut by current limiter circuit 21 in mode A, and also detects a state of a rise of drive current 46 changed by a feed switching circuit 6 in mode B. A position detector 11 measures a rise time of driving current 56 in accordance with an output signal of the current detector circuit 22. The position detector 11 includes a time counter circuit 12.

Here, a method of measuring a state of rising drive current will be explained with FIGS. 6 and 7(A) to 7(B).

A method of measuring the rise time 58 in FIG. 6 measures the driving current 56 from minimum value, which is preferably zero, to prescribed current value 57 by time counter circuit 12.

Figure 7A:
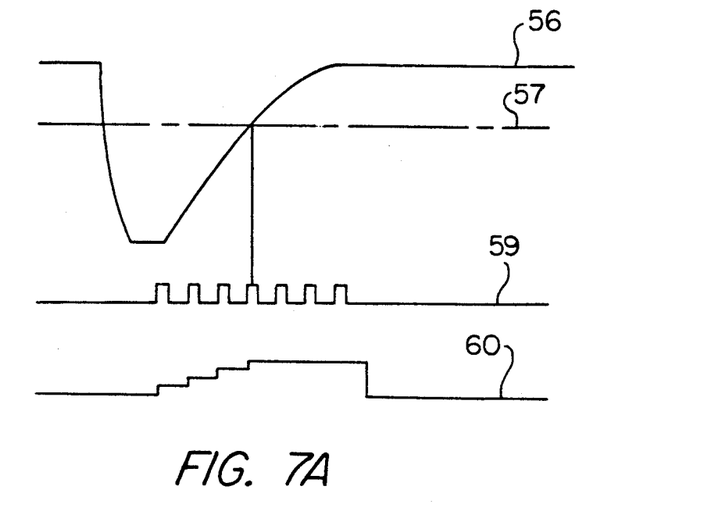

In FIG. 7(A), a measuring instruction 59 is generated as a clock signal, the number of times that measurement is conducted until a prescribed current value 57 is exceeded is counted by the time counter circuit 12, and this counter value 60 is adopted for a time count, as the measurement of the rise time 58. Since the measurements are taken at fixed intervals for the same coil during a portion of one revolution, the differentiation of rise time 58 is obtained. Switching of current to the next coil can be accomplished when this differentiation reaches a fixed minimum value (just before the center point 51 of FIG. 5), or when it reaches zero at the center point of FIG. 5, or when it changes from position to negative in passing the center point of FIG. 5.

Figure 7B:
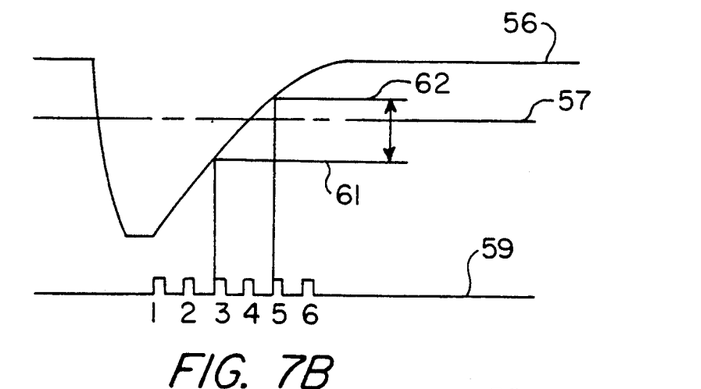

FIG. 7(B) shows another method for measurement, wherein third and fifth clock pulses of measuring instruction 59 are counter values 60 that determine the current values 61, 62. The rise time 58 is determined from the mean current of said two values 61, 62 and a difference between them. In this method, it is preferable to set the measure timing so that the mean current is reached in the proximity of the prescribed current value 57. Switching of current to the next coil can be accomplished when the mean current between the current values 61 and 62 exceeds the prescribed current value 57 (just after the center point 51 of FIG. 5).

Figure 7C:
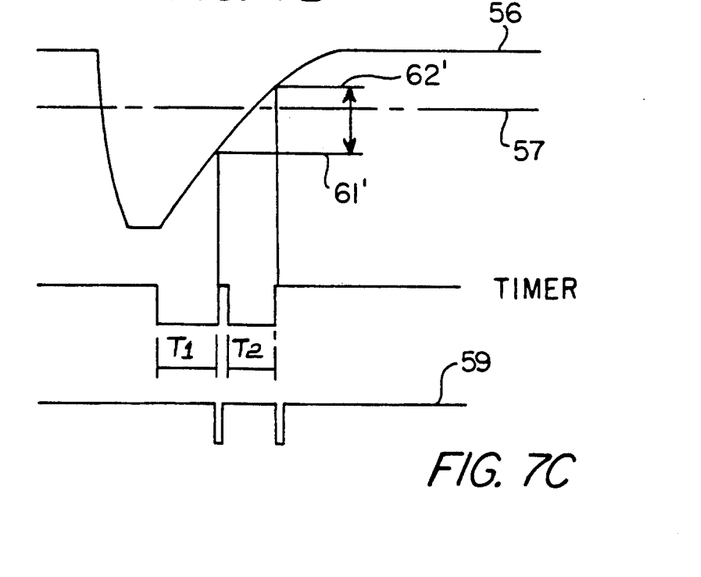

FIG. 7(C) shows still another method for measurement. In this method, measurements are made in two positions chosen arbitrarily by a timer ( not shown). Namely, when a driving current 56 rises up, the timer is set to start measuring fixed time $T_1$. After $T_1$-time has passed, first current measurement 61' is made and the timer set to start measuring fixed time $T_2$. After $T_2$-time has passed, second current measurement 62' is made. The mean current, difference and rise time 58 are determined from currents 61' and 62'. The measurement timing are different from the timing in FIG. 7(B), however, the determination of switching is as the same as in FIG. 7(B).

Figure 1:
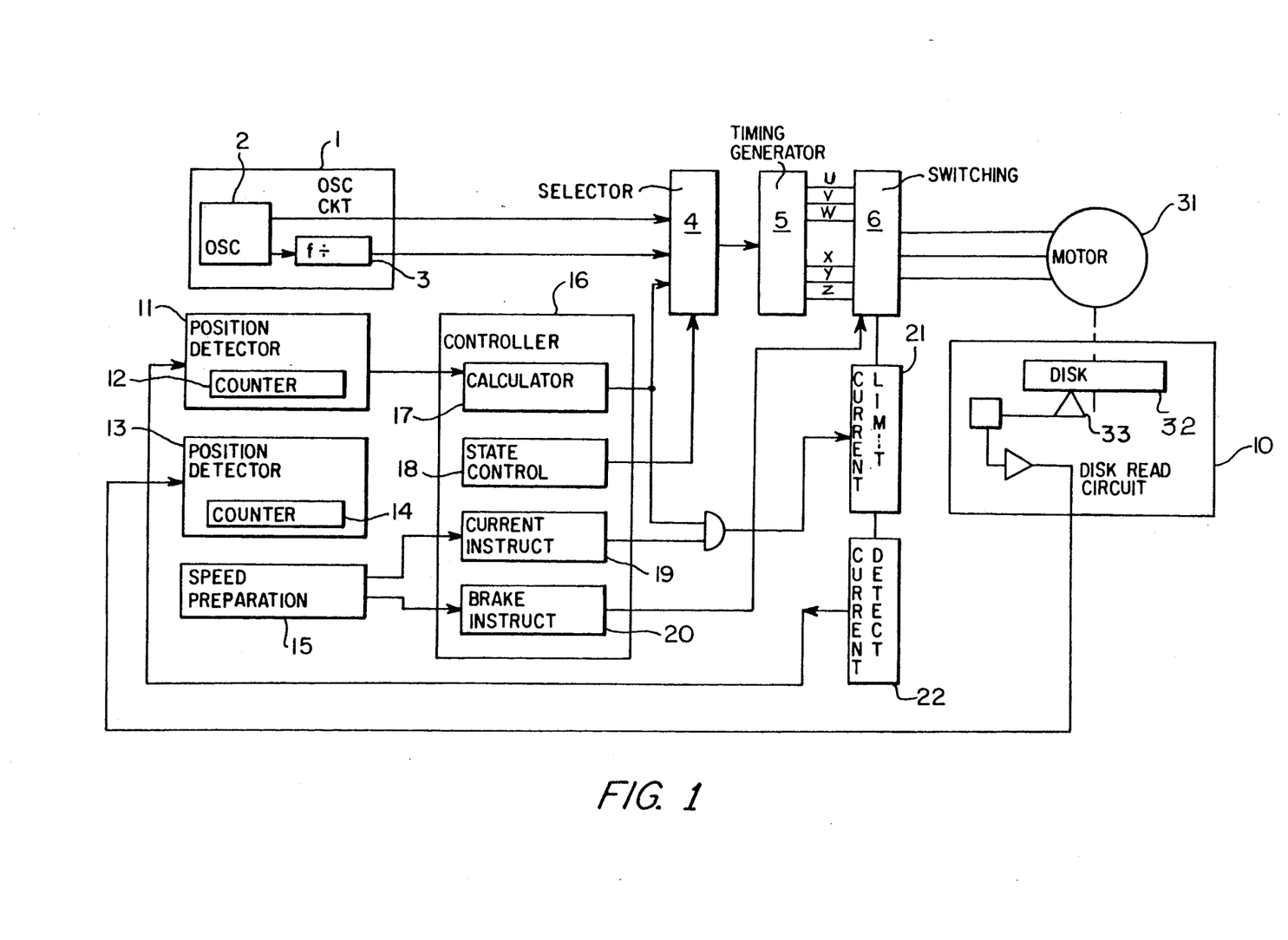
FIG. 1 is a block diagram for realizing a control method of a brushless DC motor related to an embodiment of the present invention.

In FIG. 1, a measurement value measured by position detector 11 is inputted to controller 16. The controller has a microprocessor ( not shown). A calculator circuit 17 calculates a time of energization in accordance with the measurement value. When the rotor 41 approaches as the proper position for commutation, the controller 16 sends a change signal to the signal selection circuit 4.

The magnetic head 33 reproduces informations recorded on the magnetic disk 32 and records the same thereon. A sector servo signal is recorded on the magnetic disk 32 and reproduced by the magnetic head 33. A disk read circuit 10 amplifies the reproduced sector servo signal, and sends it to a position detector 13.

A speed preparation circuit 15 calculates the number of rotations of the motor 31 by the sector servo signal, and realizes whether the rotation of the motor 31 is faster or slower than the proper rotation number. The speed preparation circuit 15 is used in mode C mainly.

When the rotation of the motor 31 is recognized to be high, a braking instruction is given to the feed switching circuit 6 by a braking instruction circuit 20, and the motor 31 is braked during a period when the instruction is given.

When the rotation of the motor 31 is recognized to be slow, an instruction for an acceleration current, i.e. an instruction to remove the limit to the current, is given to the current limiter circuit 21 by the driving current instruction circuit 19 and the acceleration current is made to flow by the feed switching circuit 6.

The rotation of the motor 31 is controlled by a normal operation, a braking operation and an acceleration operation in a time period determined by a sector servo signal, and thus the proper number of rotations is obtained.

Next, the operation of modes A to C will be explained with FIGS. 8 to 16.

FIG. 8 is a diagram for illustrating a timing of switching of the driving current of the motor 31 at the time of mode A, for the six-pole three-phase type motor. FIG. 8(A) represents a voltage of a coil terminal at U-phase. The drive current 56 of each coil is changed every 1/12 rotation period of the motor 31. A timing for limiting the driving current 56 by the current limit circuit 21 is shown in FIG. 8(B). When a current limit signal, FIG. 8(B) is generated by current limit circuit 21, the driving current 56 decrease to almost 0 immediately, as shown in FIG. 8(C). Then the current limit signal is canceled and the driving current 56 increase suddenly as shown in FIG. 8(C). In this situation, the rise time of the driving current 56 is varied in accordance with the rotor position 41 as shown in FIG. 5. Next, the rise time 58 is measured by current detect circuit 22 as shown in FIG. 8(C). The position detector 11 provides a measuring instruction 59 and detects a rotor position at this time as shown in FIG. 8(E). In FIG. 8, the measure method shown in FIG. 7(C) is used. FIG. 8(F) shows driving voltages of each coil.

In this state, data are collected on the basis of an instruction for measurement given by the time count circuit 12. By analyzing these data, the position of the rotor 41 opposite to the coil 48 is known, and when a position being appropriate for commutation is reached after several times of measurement, a commutation signal, FIG. 8(D), is delivered so that the driving current is switched over to next phase.

Figure 9:
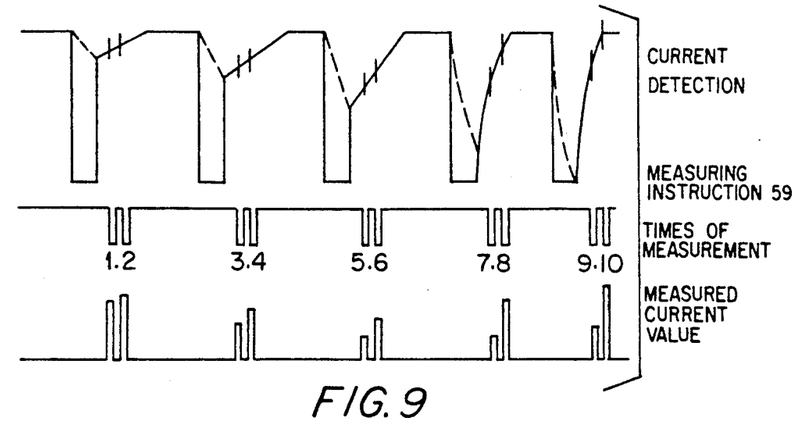
FIG. 9 is a diagram for illustrating a change in a measured current value in FIG. 8.

FIG. 9 shows enlarged spots of measurement in FIG. 8, illustrating that measured current values and also the difference between the two values are varied with the movement of the rotor 41 according to the technique of FIG. 7(B) or FIG. 7(C). Ten occurrences of the measuring instruction 59 and a corresponding ten occurrences of measured current values are shown. Measurement current value represents amounts of the driving current when the measuring instruction 59 occurred. It is seen that two current values are high and the difference between these two is small in 1st and 2nd measurements. When 1st and 2nd measurements is done, it is at a position before the proper position for a commutation (just before the center point of magnetic pole S reaches the center point 51 of FIG. 5 ). The current values turn low and the difference between the two values becomes large as approaching a proper position for a commutation. When the rotor reaches to the proper position for commutation, one of the current values becomes minimum and the difference between the two values become maximum as shown with 7th and 8th measurement. This is the proper position for a commutation (just opposite the center point 51 of FIG. 5).

When commutation is made, according to a technique explained with respect to FIG. 4 that corresponds to the 7th and 8th measurements of FIG. 9, it is preferably made just before the generation of a counterelectromotive voltage that would occur to the right of the dashed line in FIG. 15(b), to be explained later. At the times 9th and 10th measurements, the current values increase with the counterelectromotive voltage added thereto, while the difference between the two values turns to be smaller apparently than that in 7th and 8th.

When the rotation reaches high speed and the current is desired to be shifted forward from, that is earlier than, the center position of FIG. 4, the commutation can be made on the occasion of measurements 5th and 6th. Thus the state of feeding of the driving current can be adjusted freely by the detection of the position by controller 16.

Figure 10:
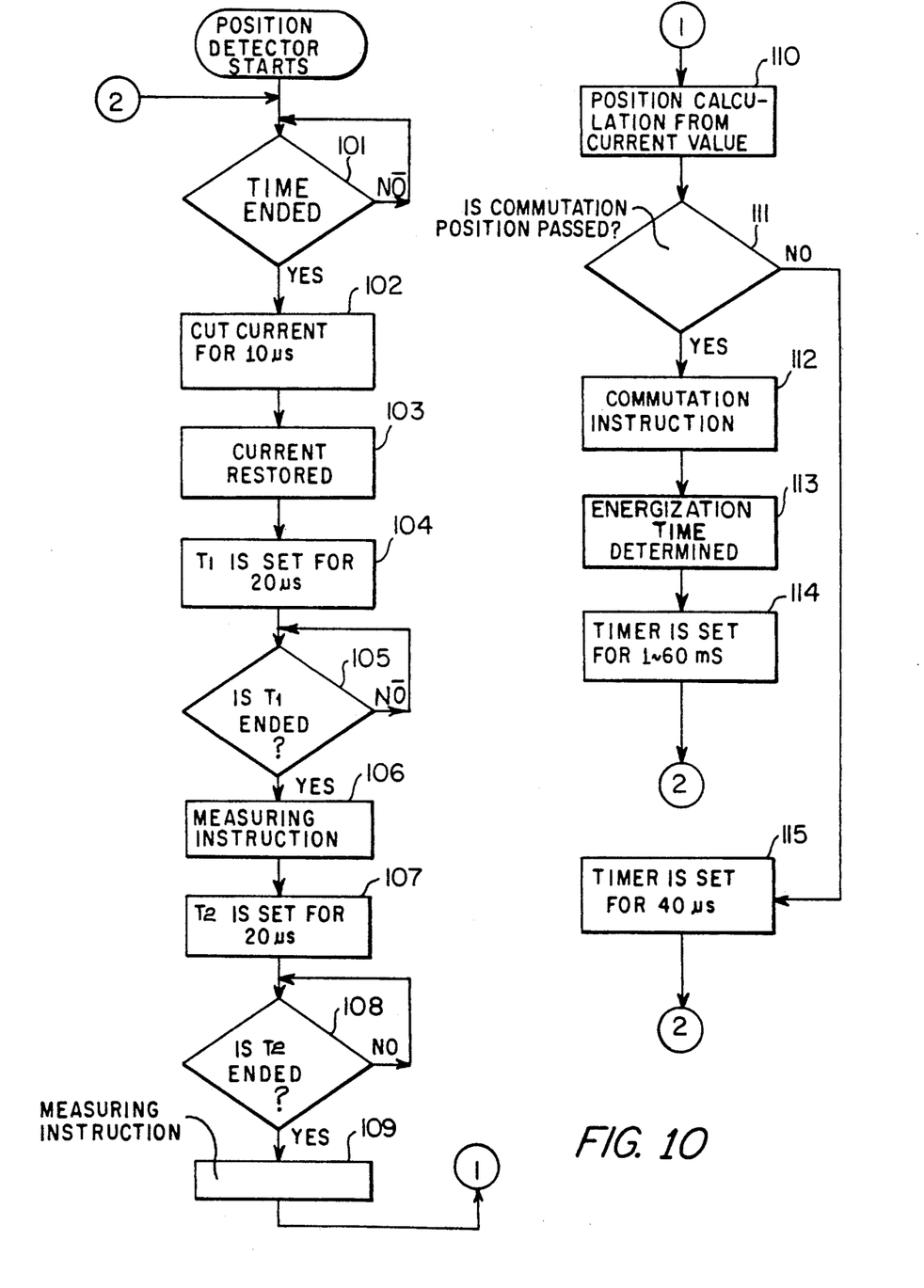
FIG. 10 is a flowchart of a control system of the motor in mode A.

FIG. 10 is a flowchart of a control system of the motor 31 in mode A.

Figure 8A:
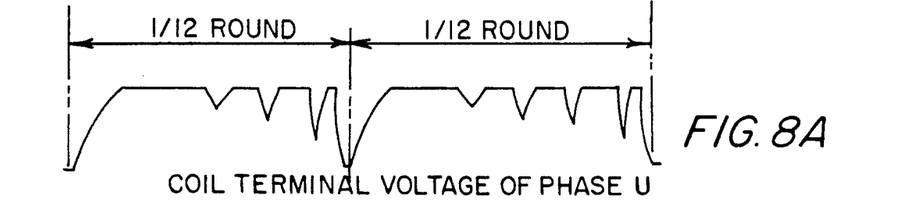
Figure 8B:
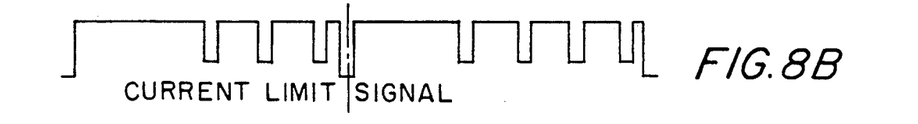
Figure 8C:
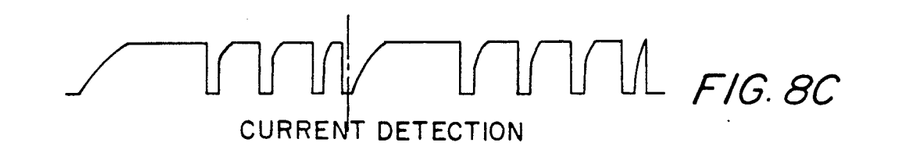
Figure 8D:
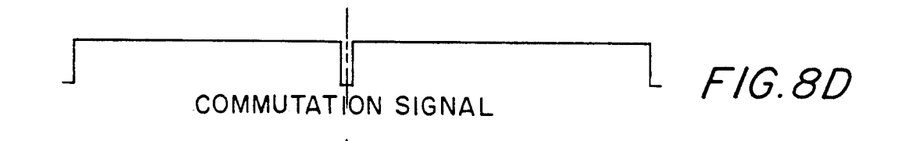
Figures 8E, 8F:
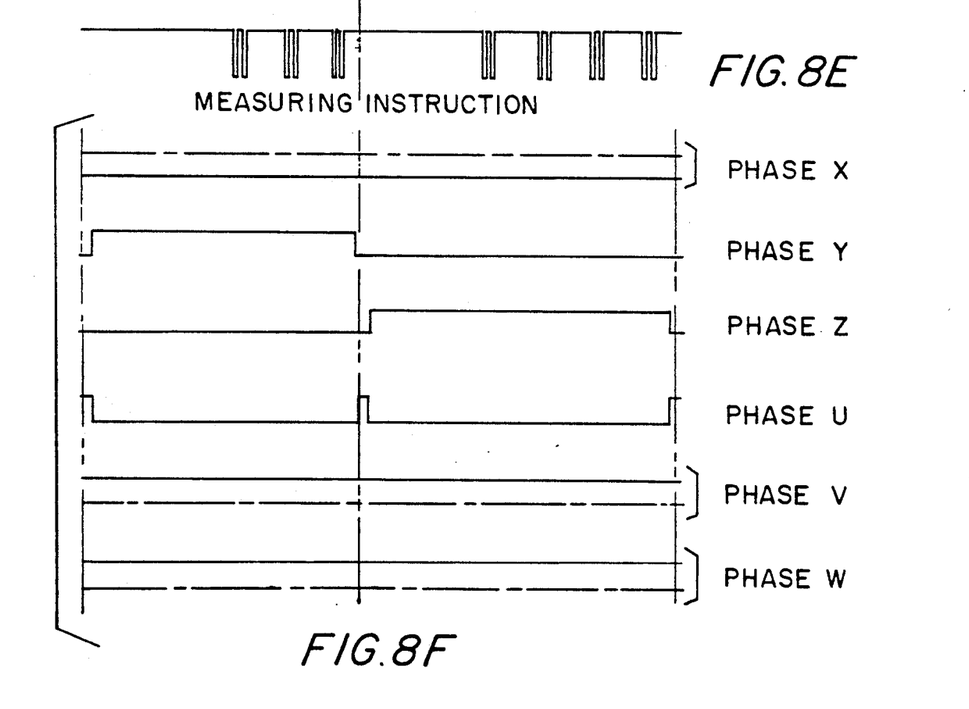

In this embodiment, the measurement method shown in FIG. 8(C) is used. First, it is checked whether a timer has indicated a fixed time is over or not (step 101). This timer decides a position detect timing of the rotor. The answer is yes, that is, when the rotor approaches the position to be detected, the driving current 56 is cut for 10μs (step 102). When the drive current 56 begins to increase (step 103), $T_1$ is set for 20μs (step 104). After $T_1$ is passed, a measuring instruction 59 is generated and the driving current 56 is measured (steps 105, 106). $T_2$ is set for 20μs (step 107). After $T_2$ is passed, a measuring instruction 59 is generated and the driving current 56 is measured (steps 108,109). Next the rotor position is detected by the difference between amounts measured in steps 106 and 109, and it is determined whether a proper position for commutation is over or not. Switching of current to the next coil can be accomplished when the mean current between the current values at $T_1$ and $T_2$ exceeds the prescribed current value (just after the center point 51 of FIG. 5)(steps 110,111). If the rotor is not over the proper position for commutation, the timer is set to 40μs for the next timing of a detection (step 115), and processing is returned to step 101. If the rotor is over the proper position for commutation, the driving current 56 is changed to the next coil(phase) immediately (step 112), an electrification time is determined by the number of the motor rotation (step 113), and the timer is set to 1~60 ms (step 114). Then processing is returned to step 101.

Next, a description will be made on a control system in mode B, which is until the steady-state rotation is reached after the rise in speed of the motor 31, by using FIGS. 11 and 12.

FIG. 11 is a time chart of the switching of an excitation phase of the motor 31. In mode A, the detection of the rotor position is done by a limitation of the drive current 56, however, a rise situation of the drive current at a time of commutation is measured in mode B without limitation of the driving current 56.

Figure 11A:
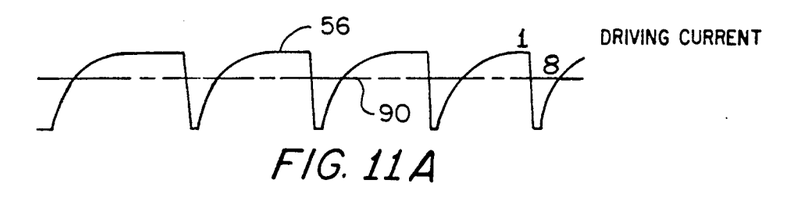
FIG. 11 is a timing chart of a control system of the motor at the time of acceleration.
Figure 11B:
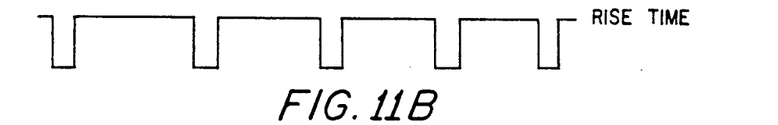
Figure 11C:
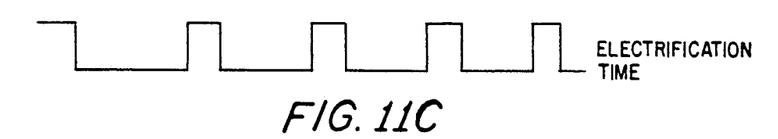
Figure 11D:
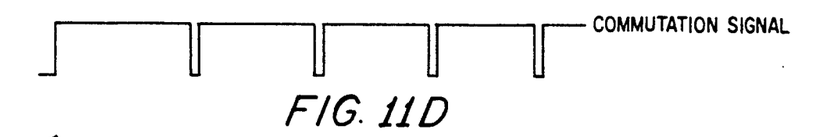
Figure 11E:
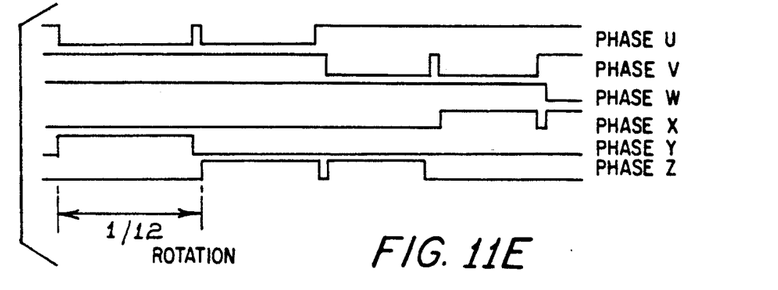

FIG. 11(a) shows a wave form of the driving current 56. The driving current 56 reduces under the prescribed current 90 at the time of every commutation. After the energization time is passed as shown in FIG. 11(c), the commutation signal is generated as shown in FIG. 11(d), and the driving current 56 is changed to the next coil(phase) as shown in FIG. 11(b). When the driving current 56 is changed to the next coil, the driving current 56 decreases for a short time, and increases to the prescribed amount again. The rise time of this driving current 56 is measured. In the meantime, the energization of motor drive windings is instructed by combinations of phases U, V and W with phases X, Y and Z being paired to the former respectively, and thereby the energization, commutation, etc. are controlled. In FIG. 11(e), the phases U to W show phase currents which are turned ON at Lo, while the phases X to Z show phase currents which are turned ON at Hi.

Figure 12:
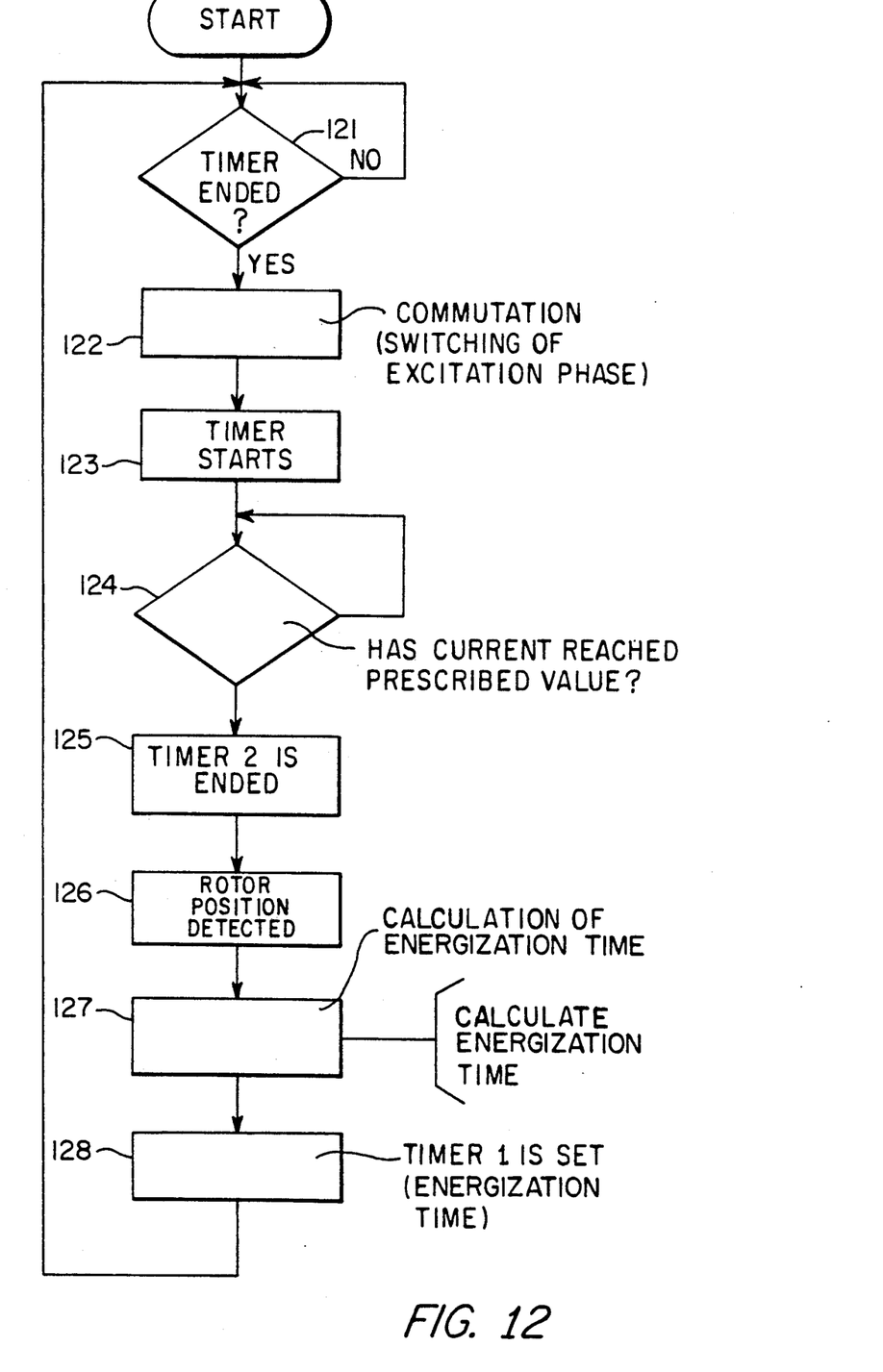
FIG. 12 is a flowchart for realizing the system in mode B.

FIG. 12 is a flowchart of the execution of the present embodiment in mode B. First, it is checked whether a time period of a timer is over or not (step 121). If the time is over, that is the rotor approaches the proper position for commutation, the driving current 56 is changed to the next coil(phase) (step 122). A rise time of the driving current 56 is measured (step 123). When the driving current 56 increase to a prescribed current, the rise time 58 is measured (steps 124, 125), and rotor position is detected (step 126). A time of energization is calculated and the time of energization is determined by a function, (preceding energization time x (1 +rotor position correction +increased speed of rotations)) (step 127). Rotor position correction is for a correction whether a rotor is over or not against a proper commutation position, and determined by the detection in the step 126. Increased speed of rotation is a correction determined by an acceleration of the motor 31.

Then the time of energization determined is set to the timer, and processing returns to step 121 (step 128).

Next, a description will be made on a system of a control executed in mode C, which is in the steady-state rotation (for example, 3600 rpm) by using FIGS. 13 to 16.

Figure 13:
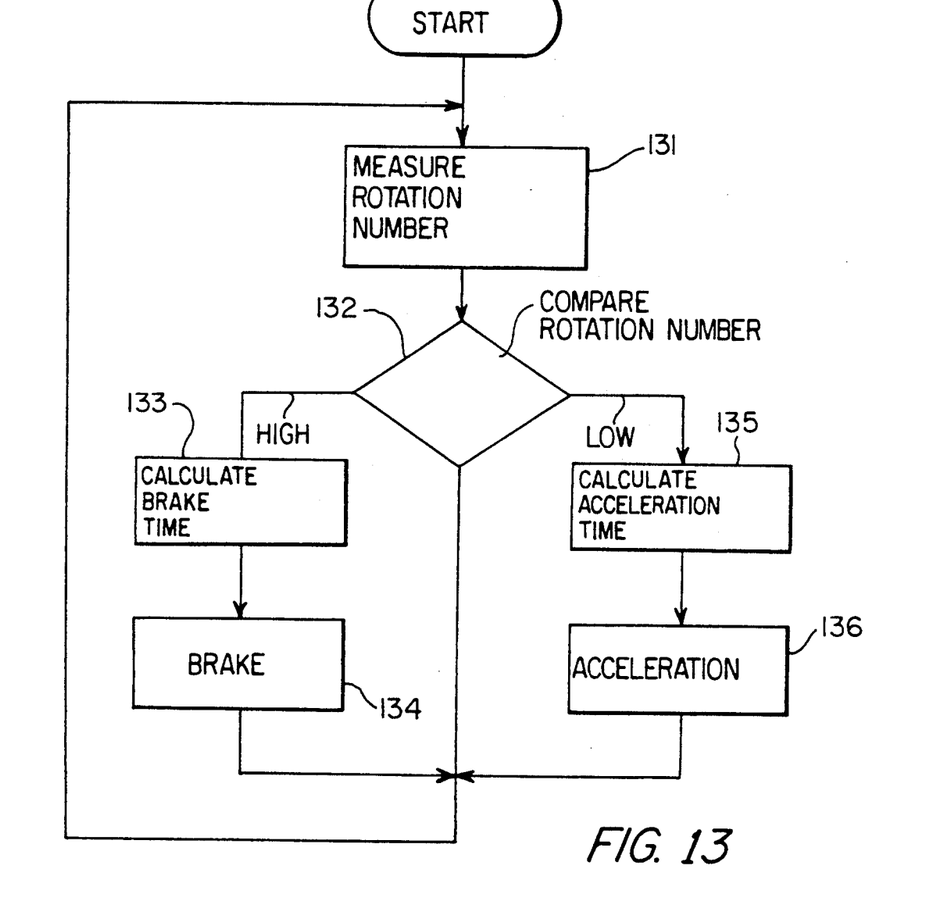
FIG. 13 is a flowchart for motor control in mode C.

FIG. 13 is a flowchart for motor control in mode C. First, the number of rotations is measured (step 131). The number of rotations is measured by using a sector servo signal recorded on the magnetic disk 32. Small driving current, for example 0.4A, flows during a steady-state rotation Next, the measured rotation speed of the motor 31 is compared with the prescribed reference rotation speed (step 132). If the rotation speed is fast, a time for a brake is determined (step 133) and a brake current is passed to the coil(phase) during a time that the magnetic head passes some number of sectors (step 134). Similarly, if the rotation is slow, a time for acceleration is determined (step 135) and acceleration current is passed to the coil(phase) during a time that the magnetic head passes some number of sectors (step 136). The acceleration current is a larger current than a steady-state driving current, for example 1.5A in the case of the motor for a 3.5 inch hard disk drive.

Figure 14:
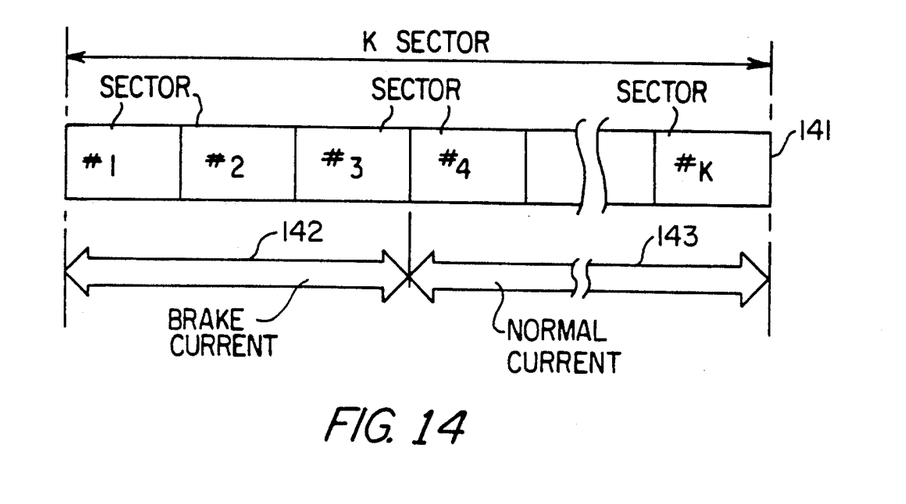
FIG. 14 is for explaining a method of determining time of braking or acceleration.

FIG. 14 is for explanation of a method of determining a time of braking or acceleration.

The magnetic disk 32 has a plurality of concentric tracks divided into sectors (not shown). On the head portion of each sector, a servo signal is recorded, and the position of the each sector is detected by reading the servo signal. In this embodiment, a plurality of the sectors are divided into groups 141 having K sectors, and control for acceleration or braking is done during passing of the groups 141. A braking current 142 is passed during passing of the sector #1 to sector #3, and a normal current 143 is applied during passing of the sectors #4 to #K, for example. A degree of braking is controlled by selecting a number of the sectors to which a braking current 142 is applied. In the control of acceleration, acceleration current may be applied instead of the braking current 142.

A plurality of methods of applying a braking current may be applied to this embodiment as below.

(1) Cut the driving current. The rotor speed will be decreased by resistance of air, friction and so on. (2) Limit the driving current to a value not enabling a holding of steady-state rotation, for example 0.2A. (3) Short coils. A sudden braking is done because of a counterelectromotive force. (4) Apply a current almost the same as acceleration current and at a position of commutation later than the proper position. Strong brake is done by a strong counterelectromotive force. This method is a particular technique using the motor in this embodiment.

Figure 15A:
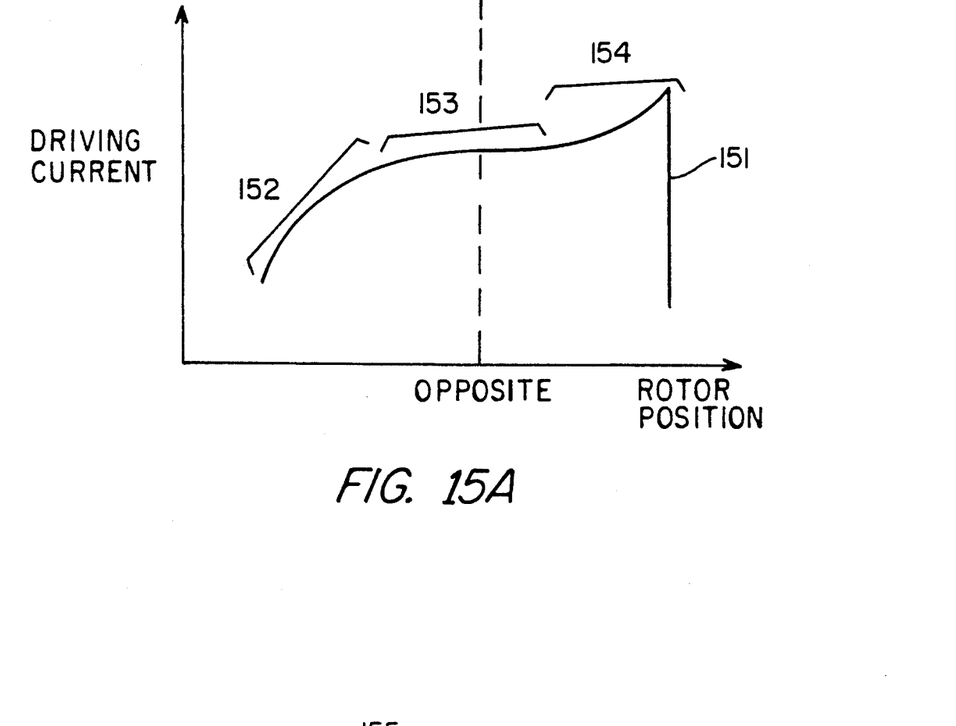
Figure 15B:
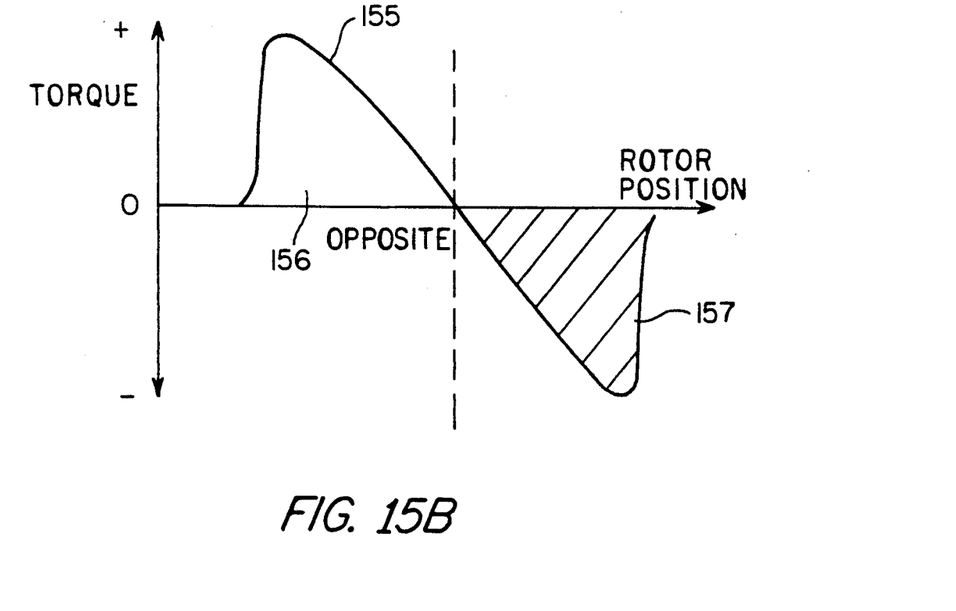

The principal of braking technique (4) is explained with FIG. 15.

FIG. 15(a) represents a relation between rotor position and an amount of a driving current 151 during a portion of one revolution of said motor 31 generally equal to the time of one revolution divided by the number of phases. The driving current 151 increases suddenly after commutation (range 152), and keeps a prescribed amount until the rotor reaches a proper position for commutation (range 153). After the rotor passes the proper position (generally indicated by the vertical dashed line), the driving current 151 increase because of counterelectromotive force (range 154). The torque 155 of the motor 31 at this time is shown in FIG. 15(b). Plus torque 156 is generated by the motor 31 before the rotor reaches a proper position (generally indicated by the vertical dashed line) for commutation. However minus torque 157 is generated by the motor 31 after the rotor reaches a proper position for commutation. The minus torque 157 brakes the rotation of the motor 31 strongly.

When the rotor reached proper position for commutation, shown by the dashed line, if the driving current is switched over to the next phase, then there is no influence of the minus torque 157. In this embodiment, the minus torque is used for braking by making the timing of commutation late. In general, the brushless DC motor of the prior art having a hall element does not change the timing of commutation during rotation. However the brushless DC motor in this embodiment can change the timing of commutation during rotation. For example, the timing of the commutation position as the eighth position shown in FIG. 9 may be moved to the tenth position.

Figure 16:
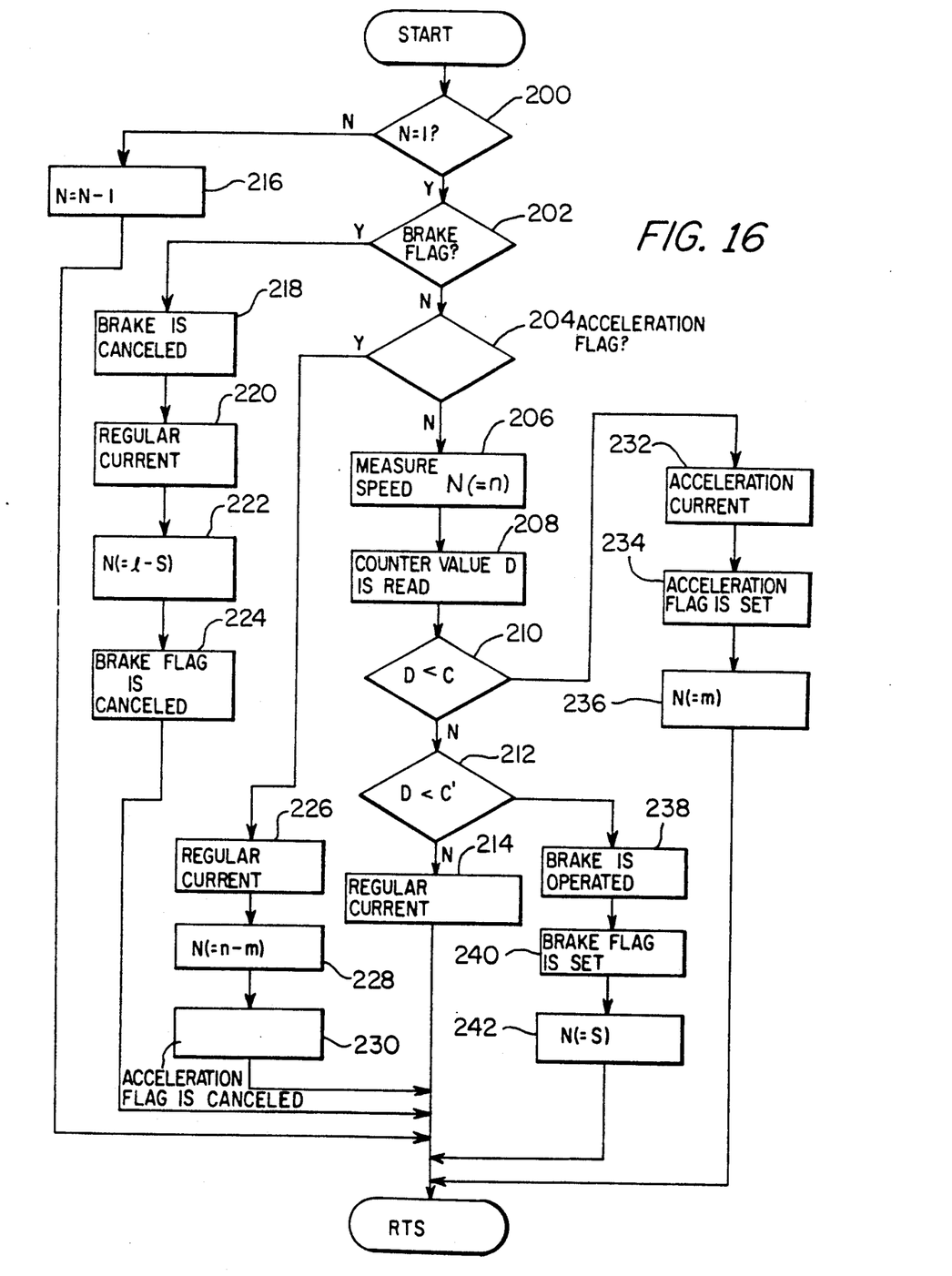
FIG. 16 is a flowchart for realizing a control of steady-state rotation of the brushless DC motor.

FIG. 16 is a flowchart for realizing a control in mode C. It is a speed control program for the motor 31 with a choice of three possible fixed amounts of the driving current 56. In addition to a normal current 143, an acceleration current and a brake current 142 are used.

An acceleration current is applied through the sectors m ($\leq$n) in numbers out of the n possible acceleration sectors while a regular current is applied through the remaining sectors n-m, when the acceleration is needed. Braking is made through the sectors s ($\leq$l) in numbers out of the possible number of acceleration sectors 1 in numbers; the regular current is applied through the remaining sectors 1−s, when deceleration is needed.

At step 200, N denotes the number of the rest of the sectors which do not have their current changed. When N is not equal 1, setting is made to N = N −1 at a step 216, and the same current amount is maintained while one is sector passed. When N=1, the amount of the driving current 56 is changed for a braking or an acceleration or normal running.

At the step 202, discrimination is made on the presence or absence of a brake flag. The brake flag occurs during the applying of brake current. If the brake flag is present, an advance is made to a step 218 to cancel braking. Then, a switching is made over to the regular current at step 220, the number of sectors N is set at step 222 N denotes the number of the sectors which is equal to 1−s, through which the regular current is applied. The brake flag is canceled at step 224.

If the brake flag is absent in step 202, an advance is made to step 204. At the step 204, the presence or absence of an acceleration flag is checked. The presence of the acceleration flag means that an acceleration is being conducted, and an advance is made to a step 226, whereat switching is made to the regular current. Then, N is set at step 228. N denotes the number of the sectors which is equal to n−m through which the regular current is applied. The acceleration flag is canceled at step 230.

If the acceleration flag is absent in step 204, the rotation speed of the motor 31 is measured by using sector servo signal at step 206. At step 208, a numeric value D, which means the time interval between the predetermined number of sectors, is read. At step 210, D and C (the time interval at the lower limit value of an allowable rotation speed, for example, C=1.01×D) are compared with each other, and when D>C, the number of rotations is recognized as small. Then an advance is made to step 232 to make an acceleration current flow, an acceleration flag is set up in step 234 and N is set in step 236. N (=m) denotes the number of sectors through which the acceleration current is applied.

When D≧C, an advance is made to a step 212. At the step 212, D and C' (the time interval at the upper limit value of the allowable rotation speed, for example, C'=0.99 ×D) are compared with each other, and when D<C', the number of rotations is recognized as large. Then an advance is made to step 238 to conduct braking, a brake flag is set up in step 240, N is set to s in step 242. N denotes the number of sectors which make braking current is applied.

When D≧C', an advance is made to step 214. The regular current only is applied, since the speed is within the allowable limits.

RTS means return to start and step 200.

In the forgoing was concretely described the invention accomplished by the inventors by way of embodiments. It should, however, be noted that the present invention is in no way limited to the above-mentioned embodiments only but can be modified in a variety of other ways without departing from the scope or the gist thereof.

For example, the brushless DC motor may be controlled with only mode A and mode C.

In mode C, the sector servo signal is used for measurement of rotations, however, another measurement method may be used.

What is claimed is:

1. A control method for brushless DC motor having a rotor, a plurality of magnetic poles and coils of a plurality of phases, wherein current is applied sequentially through said phases so as to rotate said rotor and the method is performed during each portion of one revolution of said motor generally equal to the time of one revolution dividedly by the number of phases, comprising the steps of:
   applying a current to only one of said phases;
   temporarily stopping said applying of said current of said one phase;
   thereafter reapplying said current to only the same phase as in the step of stopping without applying said current to the other coils during said one portion of one revolution;
   measuring the state of rise of said current when it begins to flow to said phase during said reapplying;
   detecting the position of one of said magnetic poles that is located at a position opposite to said one phase, based on said measured state of the rise of said current from said step of measuring;
   in response to said detecting the position of said one magnetic pole, determining whether the flow of said current is to be switched over to a next phase or not switched;
   thereafter switching said current over to the next phase when said current is determined to be switched over to the next phase; and
   repeating said proceeding steps after a prescribed interval.

2. A control method according to claim 1, wherein said step of measuring measures a time required for the rise of said current from substantially no current to a fixed current value.

3. A control method according to claim 1, wherein said step of measuring measures the number of times of generation of a clock signal for the time required for the rise of said current from substantially no current to a fixed current value.

4. A control method according to claim 1, wherein said step of measuring measures the rise of said current by determining a mean value of said current at the time when an n th (n≧1) clock signal is generated and an n+k th (k≧1) clock signal is generated.

5. A control method according to claim 1, wherein said step of measuring determines a current value obtained after the passage of a time $T_1$ after the current is stopped by said step of stopping and the mean value of said current values during the passage of the time $T_2$ ($T_1 < T_2$).

6. A control method according to claim 1, wherein said step of determining identifies the position of one of the magnetic poles generating a magnetic field opposite in direction to a magnetic field generated in the phase by said current flowing thereto by detecting the shortest time of rising of said current.

7. A control method according to claim 1, wherein said step of determining determines said phase to which said current is made to flow to be switched over when the rise time of said current is delayed from a fixed reference value.

8. A control apparatus for a brushless DC motor having a rotor, a magnet and coils of a plurality of phases, comprising:
   means, coupled to said brushless DC motor, for feeding and switching a drive current for rotating the brushless DC motor to said coils, which is made to flow for prescribed times sequentially to said coils;
   means for limiting said drive current of said coil which is made to flow for a predetermined short period;
   means for detecting a rise time of said drive current when said drive current flows again after the limiting; and
   means for controlling switching of said drive current over to the following coil in accordance with the rise of said drive current which is detected by said means for detecting.

9. In a brushless DC motor having a rotor, a magnet and coils of a plurality of phases, an apparatus for controlling of a current for driving said rotor is made to flow for every prescribed time sequentially through said coils so as to rotate said rotor, the improvement comprising:
   means for applying a current to one of said phases for every prescribed time sequentially through said phases so as to rotate said rotor;
   means for stopping temporarily a supply of said current to one phase;
   means for reapplyinq said current to the same phase without applying said current to the other coils;
   means for measuring the state of rise of said current when it begins to flow to said phase;
   means for detecting said position of one of said magnetic poles that is located at a position opposite to said one phase, based on said measured state of the rise of said current;
   means for determining whether the flow of said current is switched over to a next phase or not switched; and means for switching said current over to the next phase when said current is determined to be switched over to the next phase.

10. An apparatus for controlling according to claim 9, wherein said means for measuring has a timer.

11. An apparatus for controlling according to claim 9, wherein said means for measuring has a clock generator.

12. A control method for a brushless DC motor having a rotor, a plurality of magnetic poles and coils of a plurality of phases, and performed during a portion of one revolution of said motor generally equal to the time of one revolution divided by the number of phases, comprising steps of:
   switching said current over from one phase to a following phase;
   measuring the rise of said current of the following phase before a center position of one of said magnetic poles generating a magnetic field reaches said coil of the following phase generating another magnetic field by said current flowing thereto;
   determining a time for energization of the following phase for applying said current of the following phase according to the rise of current; and
   repeating the proceeding steps in order for the following phase.

13. A control method according to claim 12, wherein said step of measuring measures a time required for the rise of said current from substantially no current to a fixed current value.

14. A control method according to claim 12, wherein said step of measuring measures the number of times of generation of a clock signal for the time required for the rise of said current from substantially no current to a fixed current value.

15. A control method according to claim 12, wherein said step of measuring measures the rise of said current by determining a mean value of said current at the time when an n th (n≧1) clock signal is generated and an n+k th (k≧1) clock signal is generated.

16. A control method according to claim 12, wherein said step of measuring determines a current value obtained after the passage of a time $T_1$ after said current is stopped by said step of stopping and the mean value of said current values during the passage of the time $T_2$ ($T_1 < T_2$).

17. In a brushless DC motor having a rotor, a magnet and coils of a plurality of phases, and in which a current is made to flow for every prescribed time sequentially through the phases so as to rotate said rotor synchronously, an apparatus for controlling of a current for driving said rotor comprising;
   means for switching said current over from one phase to the following phase;
   means for measuring the rise of said current of the following phase before a center position of one of said magnetic poles generating a magnetic field reaches the coil of the following phase generating another magnetic field by said current flowing thereto;
   means for determining a time for energization of the following phase according to the rise of current.

18. An apparatus for controlling according to claim 17, wherein said means for measuring having a timer.

19. An apparatus for controlling according to claim 17, wherein said means for measuring having a clock generator.

20. In a motor control method for a storage apparatus having a disk whereon servo informations are written, a motor which drives said disk by a fixed rotational speed, transducer means for reading said servo informations written on said disk, and a detector circuit which detects the position of said disk from said servo informations which are read, a control method, comprising the steps of:
   setting a first current amount made to flow at the time of steady-state rotations, a second current amount made to flow when the speed of said motor is increased and a third current amount made to flow when the speed of said motor is reduced,
   obtaining the rotational speed of said motor on the basis of the detected position of said disk;
   determining whether the obtained rotational speed from the proceeding step is larger or smaller than said fixed rotational speed; and
   selecting a second current amount from one of said amounts set in the step of said setting in response to said determining;
   making the second current flow for a certain short time to a coil of said motor through which said current is let to flow when the number of rotations is smaller, and the third current flow for a certain short time to a coil of said motor through which said current is let to flow when the number of rotations is larger said first, second and third current amount switching over in a time-sharing manner to perform a constant speed control of said motor.

21. A control method according to claim 20, including providing said disk as a magnetic disk.

22. A control method according to claim 21, including providing said servo informations as sector servo informations written in the forefront part of each sector provided on said disk.

23. A control method according to claim 20 including changing a timing of a commutation based on said current amounts so as to generate a counterelectromotive of said motor.

24. A control method according to claim 23, wherein said step of changing changes said current to the next phase when a center position of one of said magnetic poles generating one magnetic field passes the coil of the next phase generating the other magnetic field by said current flowing thereto.

25. A control method according to claim 8, wherein said short period is a divided portion of said prescribed times.

26. A control method according to claim 1, wherein said stopping and applying of said current is repeated for said phase until said current is switched to said following phase;

27. An apparatus for controlling according to claim 9, further comprising means for stopping and applying of said current repeatedly for said phase until said current is switched to said following phase.

28. In a brushless DC motor for a storage device having a disc whereon servo information is written, a motor which drives said disc by a fixed rotational speed, transducer means for reading said servo information written on said disc, and a detector circuit which detects the position of said disc from said servo information which is read, an apparatus comprising:
   means for setting a first current amount made to flow during a steady-state rotation, means for flowing a second current amount when the speed of said motor is increased, means for flowing a third current amount when the speed of said motor is reduced, means for obtaining a rotation speed of said motor on the basis of a detected position of said disc, means for determining whether the obtained rotational speed is larger or smaller than said fixed rotational speed, means for selecting the second current amount in response to said means for determining, means for making the second current amount flow for a certain short time to a coil of said motor when the number of rotations is smaller than said fixed rotational speed, means for making the third current amount flow for a certain short time to a coil of said motor when the number of rotations is larger than said fixed rotational speed, and means for switching said first, second and third current amounts in a time-sharing manner to perform a constant speed control of said motor.

29. An apparatus according to claim 28, wherein said disk is a magnetic disk.

30. An apparatus according to claim 29, wherein said servo information is provided as sector servo information written as a forefront part of each sector provided on said disk.

31. An apparatus according to claim 28, further comprising means for changing a commutation based upon said current amounts so as to generate a counter-electromotive of said motor.

32. An apparatus according to claim 31, wherein said means for changing a commutation changes said current to the following phase when a center position of one of said magnetic poles generating one magnetic field passes a coil of the following phase generating the other magnetic field by said current flowing thereto.

33. A control method according to claim 6, wherein said control method controls the motor from a time of no rotation to a time of slow rotation.

34. A control method according to claim 13, wherein said control method is performed from a time of slow rotation to a time of steady-state rotation.

* * * * *